Nov. 18, 1952     C. M. HARTNETT     2,618,363
WHEEL BRAKE DEVICE
Filed Oct. 21, 1949
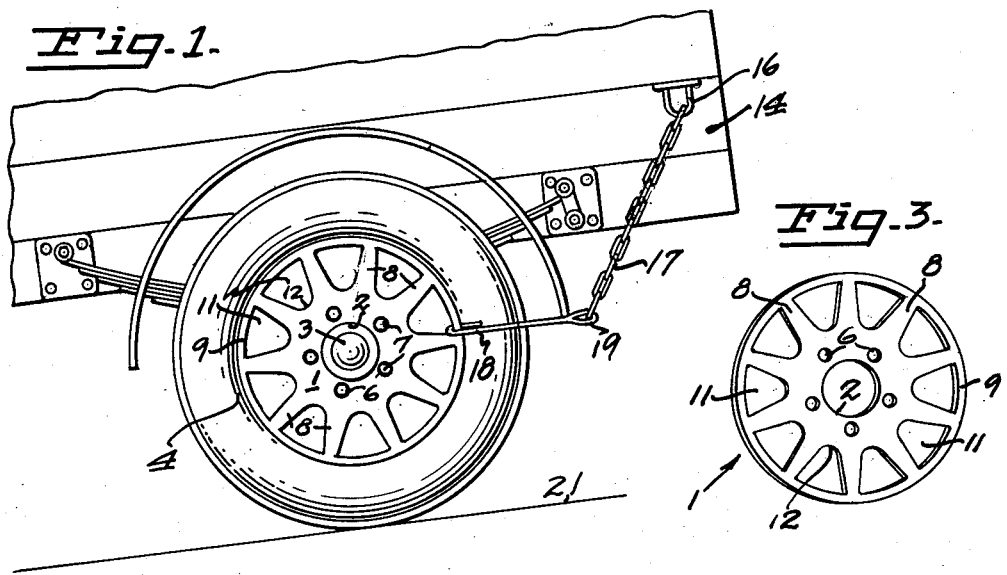
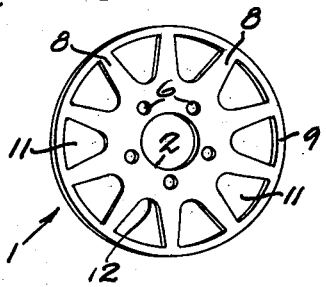
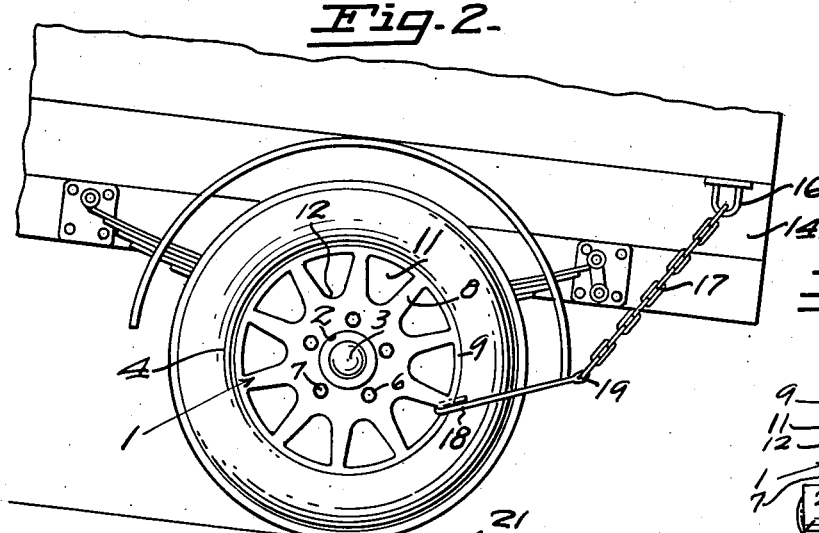
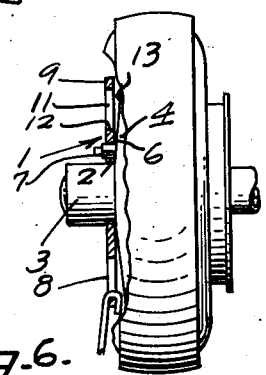
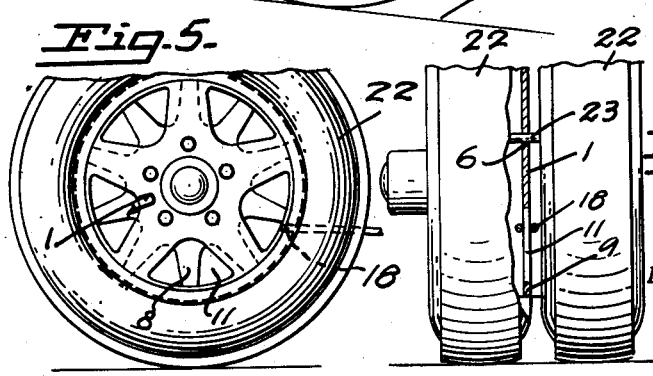
INVENTOR.
CLARENCE M. HARTNETT
BY George B. White
ATTORNEY Patented Nov. 18, 1952

2,618,363

UNITED STATES PATENT OFFICE 2,618,363

WHEEL BRAKE DEVICE

Clarence M. Hartnett, Mountain View, Calif.

Application October 21, 1949, Serial No. 122,625

3 Claims. (Cl. 188—31)

This invention relates to wheel holder or blocking device for vehicles.

The primary object of this invention is to provide a device for preventing rolling of a vehicle in any direction, which device can be quickly and easily applied to a parked vehicle.

A feature of the invention is that when it is applied to a parked vehicle on any hill or incline, it holds the wheel of the vehicle stationary, and thereby prevents the running away of vehicles and resultant accidents and damages.

My device is particularly advantageous on delivery or the like vehicles, such as milk trucks or ice trucks, and the like, which vehicles must be stopped frequently and at short intervals and for short periods, frequently with the engine running. Accidents are frequent by reason of the rolling away of unattended trucks for many reasons. My device is quickly applicable to such vehicles and positively stops them in any parked position at will.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Figure 1 is a fragmental view of a vehicle with my device attached to a rear wheel thereof to prevent forward rolling of the wheel on the incline.

Figure 2 is a fragmental view of the vehicle showing the rear wheel with my device stopping backward rolling of the vehicle on an incline.

Figure 3 is a detail view of the wheel disk of my device.

Figure 4 is a partly sectional view of my device on a wheel.

Figure 5 is a fragmental view of my device applied on a double wheel, and

Figure 6 is a partly sectional fragmental view of my device on the double wheel.

In carrying out my invention I make use of a star disk 1, which is provided with a hub opening 2 to fit over the hub cap 3 of a wheel 4. A plurality of bolt holes 6 are arranged around and outside of the hub opening 2 in circumferentially spaced relation corresponding to the arrangement of the bolts 7 on the wheel 4 and slidably fitting thereover.

A plurality of radial spokes 8 extend to an outer rim or ring 9 so as to form a plurality of insert or keeper holes 11 diverging from inner apex 12 to the rim 9. The disk is in a straight plane so that in position on the wheel the spokes 8, the keeper holes 11, and the rim 9 are spaced from the face 13 of the wheel.

On the body or frame 14 of the vehicle adjacent the wheel 4 is a loop 16 on which hangs a chain 17 suspending a hook 18 pivoted on an eye 19 on the chain 17.

In operation the disk 1 is placed over the wheel 4 as shown and the hook 18 is inserted into one of the keeper holes 11 and under the rim 9. In the event the vehicle is parked forwardly to the incline 21, as shown in Fig. 1, the hook 18 is above the adjacent spoke 8.

When the vehicle is parked so that the incline 21 descends rearwardly of the vehicle, then the hook 18 is below the adjacent spoke 8. In either stance the spoke 8 bears against the hook 18 and tends to pull it and thus it blocks the wheel through the engagement of the bolt holes 6 with the respective bolts 7 preventing rotation of the wheel.

In the doublewheel structure shown in Figs. 5 and 6, the disk 1 is mounted between the wheels 22 so that the bolts 23 extend through the bolt holes 6 of the disc 1 and prevent relative rotation. When the hook 18 is placed over the rim 9 at a spoke 8, as heretofore described, it blocks the wheel against rotation.

My device is easily portable, it can be readily attached to any vehicle or truck; it can be quickly applied; it operates positively in preventing the danger of run away vehicles.

I claim:

1. In a device for blocking a wheel of a vehicle, said wheel having bolts with bolt heads on a face thereof; a disc, elements on the disc arranged to fit over said bolt heads and prevent relative rotation of the disc and wheel, a plurality of keeper elements around the periphery of said disc, and a hook connected to the vehicle and engageable with one of said keeper elements to hold said disc against rotation, each keeper element including a generally radial spoke, and a rim connecting the outer ends of the spokes.

2. In a device for blocking a wheel of a vehicle, said wheel having bolts with bolt heads on a face thereof; a disc, elements on the disc arranged to fit over said bolt heads and prevent relative rotation of the disc and wheel, a plurality of keeper elements around the periphery of said disc, and a hook connected to the vehicle and engageable with one of said keeper elements to hold said disc against rotation, each keeper element including a generally radial spoke, and a rim connecting the outer ends of the spokes, said disc being shaped for spacing said spokes and rim from the adjacent face of the vehicle for permitting the insertion of said hook around said rim at one of said spokes.

3. In a device for blocking a wheel of a vehicle, said wheel having bolts with bolt heads on a face thereof; a disc, elements on the disc arranged to fit over said bolt heads and prevent relative rotation of the disc and wheel, a plurality of keeper elements around the periphery of said disc, and a hook connected to the vehicle and engageable with one of said keeper elements to hold said disc against rotation, each keeper element including a generally radial spoke, and a rim connecting the outer ends of spokes, said disc having a central hub aperture fitting over the hub of the wheel.

CLARENCE M. HARTNETT.

REFERENCES CITED

The following references are of record in the file of this patent:

UNITED STATES PATENTS

| Number | Name | Date |
|---|---|---|
| 163,545 | Thompson | May 18, 1875 |
| 201,856 | Wilson | Mar. 26, 1878 |
| 967,308 | Barr | Aug. 16, 1910 |
| 1,165,295 | Stevens | Dec. 21, 1915 |
| 1,303,110 | Pfleeger | May 6, 1919 |
| 1,495,819 | Thomas | May 27, 1924 |